July 1, 1958  B. E. DOUGHERTY  2,840,947
ANIMAL TRAP
Filed Sept. 2, 1954  2 Sheets-Sheet 1
FIG. 1.
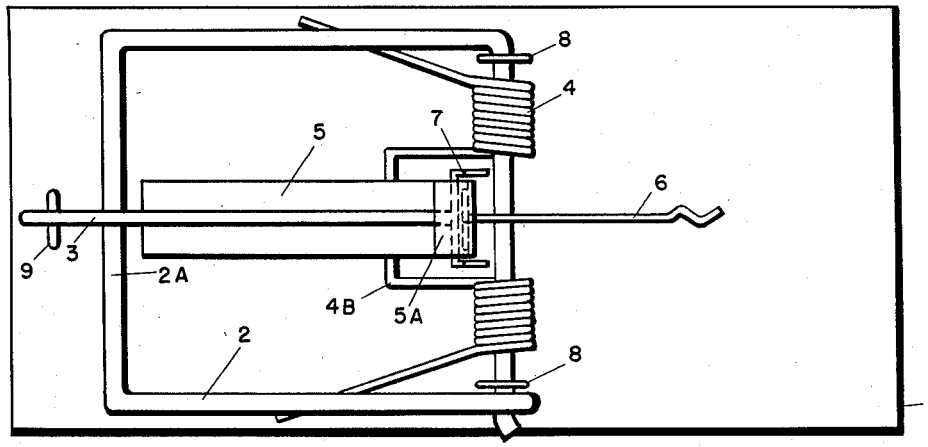
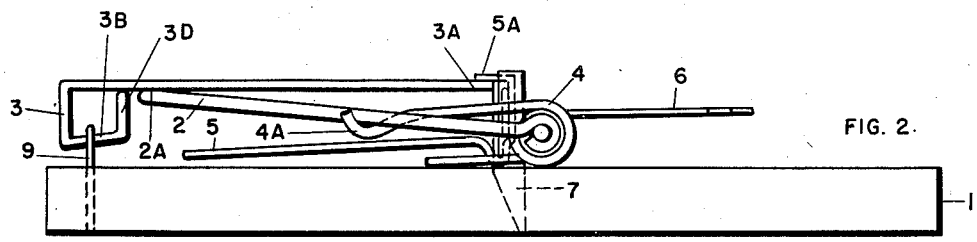
FIG. 2.
FIG. 3.  FIG. 4.
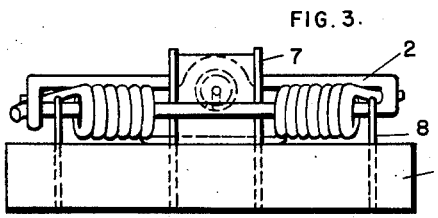 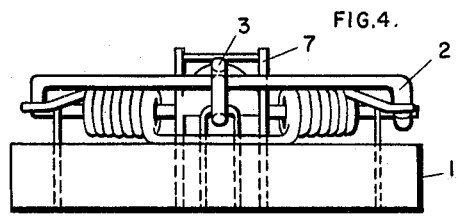
FIG. 5.  FIG. 6.  FIG. 7.  FIG. 8.
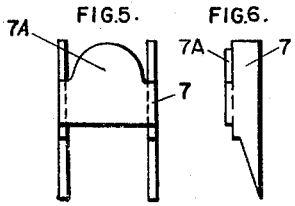 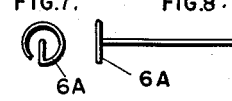 
INVENTOR
BERNARD E. DOUGHERTY
BY
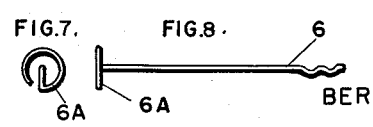
ATTORNEY July 1, 1958  B. E. DOUGHERTY  2,840,947
ANIMAL TRAP
Filed Sept. 2, 1954  2 Sheets-Sheet 2
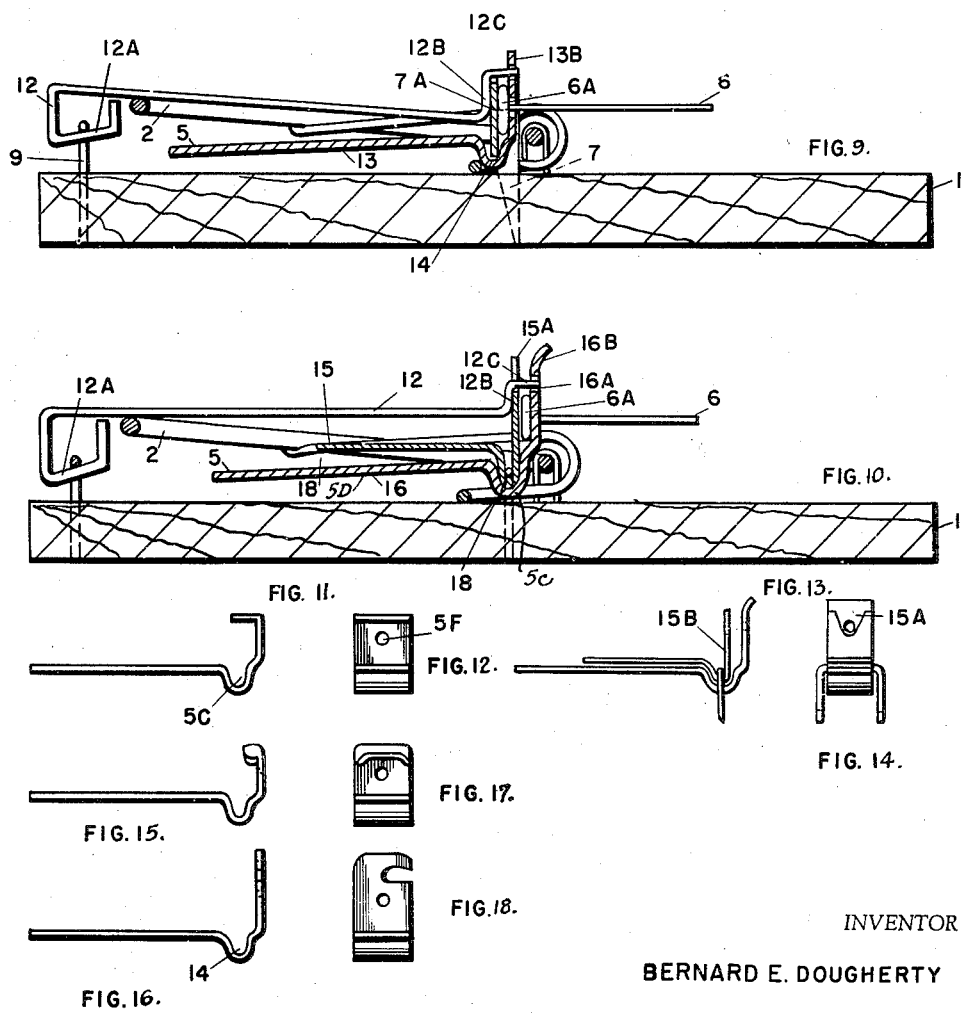
INVENTOR
BERNARD E. DOUGHERTY
BY
M. V. Gould
ATTORNEY

United States Patent Office 2,840,947
Patented July 1, 1958

2,840,947
ANIMAL TRAP

Bernard E. Dougherty, Seattle, Wash., assignor to Dodd Products, Inc., Lancaster, Pa., a corporation of Pennsylvania Application September 2, 1954, Serial No. 453,829

2 Claims. (Cl. 43—81)

This invention relates to animal traps of the pivoted jaw spring operated type.

In conventional mouse and rat traps it seems to have been a manufacturing problem to build them so that each time they are set they have the same degree of sensitivity. If the trap is too sensitive, the slight jar of placing it in position may set it off. If not sensitive enough, the bait may be stolen without the rodent being caught.

The object of the invention is to provide an animal trap having a spring operated pivoted jaw which is held in cocked position by a sear or locking bar and which is released by movement of a bait treadle.

It is a further object of the present invention to provide a bait treadle which, if moved in any plane a predetermined distance, will trigger the trap.

It is a further object of the present invention to provide a sear for holding the pivoted jaw which, by reason of its construction, is urged against a stop formed by the trigger so that the trigger engages an exact amount of sear with each setting so that the trigger must be moved this predetermined definite amount each time in order to spring the trap.

It is a further object of the present invention to provide means integral with the sear which acts through influence of the spring operated pivoted jaw to hold the sear into engagement with the trigger so that the trap will be partially self-setting.

It is a still further object of the present invention to provide a levering action of the bait treadle against the trigger, which said levering action is equally the same in all directions so that movement of the trigger in any plane will trigger the trap.

It is a still further object of the present invention to provide a staple for holding the pivoted jaw to its base, which staple serves as a pivot for the trigger and a stop for the end of the sear, thus providing a predetermined relation between the sear and the trigger which is repeated with each seting.

The invention is illustrated in the accompanying drawings in which:

Figure 1 is a plan view of a trap embodying my invention showing it in a set condition.

Figure 2 is a side elevation of the same trap in said set condition.

Figure 3 is a view of the same trap from the bait treadle end.

Figure 4 is a view from the opposite or latch end.

Figure 5 is a detail of the central staple as it appears from the latch end of the trap.

Figure 6 is a side view of the same staple.

Figures 7 and 8 show an end view and side view of the bait treadle.

Figures 9 and 10 is a longitudinal vertical view of a trap with modifications in the latch and trigger.

Figures 11 to 18 show detail views of the trigger.

Referring to Figures 1 and 2, there is shown a trap comprising a base 1 having a jaw 2 pivoted thereon at 8 and actuated by a spring 4. The jaw 2 is illustrated in set, or cocked condition, and held therein by a sear or latch 3. The trigger 5 is pivoted to rotate in a vertical direction about a point 5C (Figure 10) where it is secured to the base by a channel shaped staple 7 (Figures 2, 6 and 7). When the trigger 5 is rotated clockwise about the point 5C (Figure 5) the trigger's lip 5A disengages the forward end of the sear 3A and the trap is sprung, by permitting the spring action on the bow to swing the sear out of the way in a counter clockwise direction, while the bow is forced by said spring to pivot in a clockwise direction until the jaw engages the animal or the base at the bait end of the trap. The bait lever 6 for convenience is in the form of a wire with an enlarged head 6A (Figures 7, 8 and 10), the head lying between the cross portion of the staple 7A which is rigid and the parallel wall of the trigger 5B (Figure 10). Since the trigger 5 pivots at the point 5C the bulk of its weight, represented in the long flat portion 5D (Figure 10), by the force of gravity tends to turn the trigger in a counter clockwise direction. This does two things. It squeezes the head of the bait lever tight against the rigid section 7A and projects the lip 5A its proper distance rearward of the staple cross section 7A so as to provide exactly the desired and predetermined distance the trigger must be moved to spring the trap. To hold the trap in set condition the end 3A of the sear is placed under the protruding lip 5A of the trigger. When the forward end of the sear is under said lip it is obvious that the overlapping of lip on sear is limited because the extreme end of the sear will engage the cross wall of the staple 7 to 7A providing there is a tendency in the sear to move in that direction. If this tendency does not exist or if there is a tendency in the sear to pull back from the staple 7, it is obvious that the trap may be too sensitive to handle and might even spring by the force of the bow on the sear when in cocked condition without any help from movement of the bait lever. To assure that the sear has this tendency to move longitudinally forward towards the staple 7 which acts at its stop, an inclined section is built into the sear either as shown in Figure 2 at 3B or as 3C in Figure 5. It is obvious that without this wall 7A, or some other equivalent means for arresting the longitudinal movement of the sear, the sear instead of being uncocked by the movement of the trigger lip 5A in a clockwise direction the sear would simply follow the lip 5A and remain engaged. The same control can be accomplished by designing the length of sear so that the vertical section 3D (Figure 2) engages the cross section of the bow 2A (Figure 1) when the forward end 3A of the sear is the correct distance under the lip of trigger 5A (Figure 2).

Figure 9 is a central longitudinal vertical section of a trap similar to Figures 2 and 5 except that the sear 12 has a vertical section 12B which engages the wall of the staple 7A and controls the longitudinal movement of the sear caused by the inclined section of the sear 12A. The trigger 13 in this trap also varies from those in Figures 2, 5 and 10 in that instead of a lip with which to engage and hold the sear in set condition, this trigger is provided with a slot 13B (see Figure 12) into which the end of the sear is manually placed when the trap is being set. As the vertical section of the sear 12B engages the vertical cross section 7A of the staple it exerts the same control over sensitivity as disclosed regarding the traps shown in the previous illustrations. This trap will spring through the same clockwise rotation of the trigger, engendered by movement of the bait lever as described relative to the traps previously shown.

Figure 10 differs from the trap shown in Figure 9 in that a movable support 15 is mounted over the trigger 16 and fastened jointly to the base by a staple 17. Both pivot and support are free to pivot at point 18 when the trap is in other than set position. The trigger 16 is provided with a hole 16A in its vertical section and a curved surface 16B at its upper section above the hole (see Figure 13). The support 15 has a corresponding vertical section, the upper part of which has a V section cut out 15A. The bottom of the V is substantially level with the bottom of hole 16A. When the sear 12 under manual control is being moved into its set position, the extreme forward end of sear section 12C contacts the curved surface of the trigger 16B rotating the trigger about its pivot 18 until the end of the sear falls into the hole 16A of the trigger. The V slot in support 15 helps guide the end of the wire sear into the hole as it is moved down. At the same time the vertical section 12B of the sear engages the rear side of the vertical portion of support 15 just below the V slot 15A. It is obvious that with sufficient space 18 between the support 15 and the horizontal portion of the trigger 16 any movement of the bait lever will spread the vertical sections of these two members apart as they can pivot relatively at point 18 and cause the end of the sear to disengage the hole 16A and spring the trap. Thus I have provided in a spring trap with bait lever trigger and sear combining to hold a jaw in set position, an improved means for controlling the relative interlocking of said vital parts so that a predetermined degree of sensitivity can be established and maintained automatically without special supervision and care on the part of the human operator.

While I have illustrated and described certain preferred embodiments of my invention, it will be understood that the invention is not so limited but may be otherwise practiced and embodied within the scope of the following claims.

What is claimed is:

1. An animal trap of the type having a spring operated pivoted jaw, comprising a sear formed of a length of wire having one end bent to substantially form a square, one side of said square being inclined with respect to the extended length of said sear, a staple engaging said inclined portion so that upward pressure on the extended length of said sear tends to move the sear in a longitudinal direction, a pivoted trigger engaging the free end of said sear, and a bait lever formed of a single piece of wire and bent at one end to provide a head portion extending concentrically with respect to the length of said bait lever, said head portion engaging said trigger, said bait lever being pivoted at a point adjacent said head portion whereby movement of said bait lever in any direction about its pivot will cause said head portion to trip said trigger releasing said sear held pivoted jaw.

2. An animal trap of the type having a spring operated pivoted jaw, comprising a sear formed of a length of wire having one end bent to substantially form a square, one side of said square being inclined with respect to the extended length of said sear, a staple engaging said inclined portion so that upward pressure on the extended length of said sear tends to move the sear in a longitudinal direction, a pivoted trigger having a vertical section and a lip, said lip engaging the free end of said sear, the engagement length being limited by contact of the free end of the sear with the vertical section of the trigger, and a bait lever formed of a single piece of wire and bent at one end to provide a head portion extending concentrically with respect to the length of said bait lever, said head portion engaging said trigger, said bait lever being pivoted at a point adjacent said head portion whereby movement of said bait lever in any direction about its pivot will cause said head portion to trip said trigger releasing said sear held pivoted jaw.

References Cited in the file of this patent

UNITED STATES PATENTS

| | | |
|---|---|---|
| 1,791,172 | Suhr | Feb. 3, 1931 |
| 1,799,323 | Ross et al. | Apr. 7, 1931 |
| 2,298,634 | Abbott | Oct. 13, 1942 |
| 2,368,634 | Stilson | Jan. 30, 1945 |
| 2,426,973 | McCrummon | Sept. 2, 1947 |
| 2,489,093 | Lehn et al. | Nov. 22, 1949 |
| 2,543,466 | Peterson | Feb. 27, 1951 |
| 2,721,415 | Holmes | Oct. 25, 1955 |